US007653475B2

(12) United States Patent
Hokuto

(10) Patent No.: US 7,653,475 B2
(45) Date of Patent: Jan. 26, 2010

(54) FUEL INJECTION CONTROL APPARATUS AND CONTROL METHOD OF INTERNAL COMBUSTION ENGINE

(75) Inventor: Hiroyuki Hokuto, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/085,833

(22) PCT Filed: Feb. 26, 2007

(86) PCT No.: PCT/IB2007/000449

§ 371 (c)(1), (2), (4) Date: May 30, 2008

(87) PCT Pub. No.: WO2007/099425

PCT Pub. Date: Sep. 7, 2007

(65) Prior Publication Data

US 2009/0138181 A1 May 28, 2009

(30) Foreign Application Priority Data

Feb. 28, 2006 (JP) ............................ 2006-051681
Feb. 28, 2006 (JP) ............................ 2006-053289

(51) Int. Cl.
*B60T 7/12* (2006.01)
*F02B 1/00* (2006.01)

(52) U.S. Cl. ...................... 701/103; 701/115; 123/429; 123/432; 123/674

(58) Field of Classification Search ................ 701/101, 701/103, 104, 115; 123/429, 430, 431, 432, 123/434, 674
See application file for complete search history.

(56) References Cited

U.S. PATENT DOCUMENTS

| | | | | | |
|---|---|---|---|---|---|
| 5,797,370 | A * | 8/1998 | Kimura et al. | .............. | 123/478 |
| 6,973,910 | B2 * | 12/2005 | Ohtani | ...................... | 123/295 |
| 7,013,873 | B2 * | 3/2006 | Oomori | ...................... | 123/431 |
| 7,055,500 | B2 * | 6/2006 | Miyashita et al. | ...... | 123/406.47 |
| 2006/0037581 | A1 * | 2/2006 | Miyashita et al. | ........... | 123/305 |
| 2006/0037582 | A1 | 2/2006 | Adachi et al. | | |

FOREIGN PATENT DOCUMENTS

| | | |
|---|---|---|
| EP | 1 591 650 | 11/2005 |
| JP | 3-185242 | 8/1991 |
| JP | 2005-48730 | 2/2005 |
| JP | 2005-214015 | 8/2005 |
| JP | 2005-315124 | 11/2005 |
| WO | WO 2005/113968 | 12/2005 |

* cited by examiner

*Primary Examiner*—John T Kwon
(74) *Attorney, Agent, or Firm*—Finnegan, Henderson, Farabow, Garrett & Dunner, LLP

(57) ABSTRACT

A fuel injection correction coefficient for a first fuel injection valve and a second fuel injection valve with respect to a second fuel injection proportion in a second combustion is learned (step 107) in each of learning regions based on the fuel supply amount supplied into a cylinder, by carrying out a first combustion whose fuel injection proportion is set to the second fuel injection proportion, in the operation region of the second combustion (step 106).

15 Claims, 4 Drawing Sheets

FUEL INJECTION CONTROL APPARATUS AND CONTROL METHOD OF INTERNAL COMBUSTION ENGINE

FIELD OF THE INVENTION

The invention relates a fuel injection control apparatus and a fuel injection control method of an internal combustion engine.

BACKGROUND OF THE INVENTION

There is a known internal combustion engine which has a first fuel injection valve that injects fuel directly into a cylinder and a second fuel injection valve that injects fuel into an intake port, and which performs homogeneous combustion by supplying fuel into the cylinder through the use of these two fuel injection valves. In such internal combustion engines, generally, the combustion air-fuel ratio is adjusted to the fuel-lean side of the stoichiometry air-fuel ratio during a low engine load state, and is adjusted to the stoichiometric air-fuel ratio during a high engine load state. During the low engine load state, the proportion of the fuel injection from the second fuel injection valve is made larger than the proportion of the fuel injection from the first fuel injection valve, with the intention of further enhancing the homogeneity of homogeneous air-fuel mixture. During the high engine load state, the proportion of the fuel injection from the first fuel injection valve is made larger than the proportion of the fuel injection from the second fuel injection valve, with the intention of lowering the in-cylinder temperature and further enhancing the charging efficiency.

If the combustion air-fuel ratio is the stoichiometric air-fuel ratio, the combustion temperature becomes high, and thus heightens the in-cylinder temperature, so that deposit is likely to form on the nozzle hole of the first fuel injection valve that has an opening within the cylinder. Therefore, making the fuel injection proportion of the first fuel injection valve larger than the fuel injection proportion of the second fuel injection valve is advantageous for lowering the nozzle hole temperature of the first fuel injection valve and curbing the deposit precipitation on the nozzle hole.

In order to accurately control the amount of fuel supplied into a cylinder, it is necessary to correct the amount of fuel injected from each fuel injection valve. In the case of the aforementioned internal combustion engine, since fuel is always injected from the two fuel injection valves, it is difficult to set a different fuel injection correction coefficient for each fuel injection valve. Hence, the amount of fuel that is actually supplied into a cylinder is calculated from the air-fuel ratio of exhaust gas detected by an air-fuel ratio sensor. Then, on the basis of the excess or deficiency of the calculated fuel amount from a necessary fuel supply amount, the same fuel injection correction coefficient with respect to the two fuel injection valves is learned.

The thus-learned fuel injection correction coefficient is effective only with respect to the fuel injection proportion between the first fuel injection valve and the second fuel injection valve at the time of learning and, strictly speaking, the necessary fuel supply amount at the time of learning. Therefore, it has been proposed to learn a correction coefficient for each of operation regions of different fuel injection proportions (e.g., see Japanese Patent Application Publication No. JP-A-3-185242).

Generally, the air-fuel ratio sensor is able to detect an accurate air-fuel ratio near the stoichiometric air-fuel ratio. Therefore, during the homogenous combustion at the stoichiometric air-fuel ratio, a fuel injection correction coefficient with respect to the then used fuel injection proportion can be learned. However, the air-fuel ratio sensor is not able to accurately detect a ratio that is less than the air-fuel ratio of about 18, such as an air-fuel ratio occurring during the homogenous combustion at a lean air-fuel ratio for curbing the amount of $NO_X$ production. Therefore, during the lean air-fuel ratio homogenous combustion, an accurate fuel injection correction coefficient cannot be learned with respect to the then used fuel injection proportion. Furthermore, the air-fuel ratio sensor is also unable to accurately detect such a rich air-fuel ratio as in an operation (hereinafter, referred to as "rich spike") in which the combustion air-fuel ratio is adjusted to the fuel-rich side to perform a regeneration process in which a $NO_X$ storage reduction catalyst disposed in the engine exhaust system is reduced and purified by releasing stored $NO_X$ therefrom. Therefore, during the rich spike, too, an accurate fuel injection correction coefficient cannot be learned with respect to the then fuel injection proportion.

Thus, during the lean air-fuel ratio homogenous combustion, the amount of fuel injection cannot be accurately corrected, so that a more-than-necessary amount of fuel may be supplied into a cylinder and the amount of $NO_X$ production may increase, or so that a less-than-necessary amount of fuel may be supplied into a cylinder and a necessary torque cannot be generated. Furthermore, during the rich spike, too, the amount of fuel injection cannot be accurately corrected, so that the regeneration process of the $NO_X$ storage reduction catalyst device may be performed insufficiently, or so that more fuel than needed for the regeneration process may be supplied and the fuel economy may deteriorate.

DISCLOSURE OF THE INVENTION

It is an object of the invention to make it possible to learn a fuel injection correction coefficient at the time of a second combustion in a fuel injection control apparatus of an internal combustion engine which includes a first fuel injection valve that injects fuel into a cylinder and a second fuel injection valve that injects fuel into an intake port, and which supplies fuel into the cylinder by using both the first fuel injection valve and the second fuel injection valve, and which switches between a first combustion whose combustion air-fuel ratio is near a stoichiometric air-fuel ratio and whose fuel injection proportion between the first fuel injection valve and the second fuel injection valve is a first fuel injection proportion, and a second combustion whose combustion air-fuel ratio is an air-fuel ratio different from the combustion air-fuel ratio of the first combustion and whose fuel injection proportion between the first fuel injection valve and the second fuel injection valve is a second fuel injection proportion, and in a fuel injection control method thereof.

A first aspect of the invention relates to a fuel injection control apparatus of an internal combustion engine which includes a first fuel injection valve that injects fuel into a cylinder and a second fuel injection valve that injects fuel into an intake port, and which supplies fuel into the cylinder by using both the first fuel injection valve and the second fuel injection valve, and which switches between a first combustion whose combustion air-fuel ratio is near a stoichiometric air-fuel ratio and whose fuel injection proportion between the first fuel injection valve and the second fuel injection valve is a first fuel injection proportion, and a second combustion whose combustion air-fuel ratio is an air-fuel ratio different from the combustion air-fuel ratio of the first combustion and whose fuel injection proportion between the first fuel injection valve and the second fuel injection valve is a second fuel injection proportion. In the fuel injection control apparatus, a fuel injection correction coefficient for the first fuel injection valve and the second fuel injection valve with respect to the second fuel injection proportion in the second combustion is learned in each learning region based on a fuel supply amount supplied into the cylinder, by performing the first combustion whose fuel injection proportion is set to the second fuel injection proportion, in an operation region of the second combustion.

During the second combustion during which the air-fuel ratio cannot be accurately detected by the air-fuel ratio sensor, the fuel injection correction coefficient for the first fuel injection valve and the second fuel injection valve with respect to the second fuel injection proportion in the second combustion cannot be learned. Therefore, in the operation region of the second combustion, the first combustion during which the air-fuel ratio can be accurately detected by the air-fuel ratio sensor is carried out with the fuel injection proportion set to the second fuel injection proportion for the time of the second combustion, and the fuel injection correction coefficient for the first fuel injection valve and the second fuel injection valve with respect to the second fuel injection proportion in the second combustion is learned in each of learning regions based on the fuel supply amount supplied into the cylinder.

Fuel injection amounts of the first fuel injection valve and the second fuel injection valve during the second combustion may be corrected by the learned fuel injection correction coefficient without carrying out a feedback correction based on the output of the air-fuel ratio sensor.

The fuel injection correction coefficient in the second combustion learned in each learning region based on the fuel supply amount supplied into the cylinder, that is, the total fuel supply amount of the first fuel injection valve and the second fuel injection valve, is accurate. By correcting the fuel supply amounts of the first fuel injection valve and of the second fuel injection valve during the second combustion via the learned fuel injection correction coefficient without carrying out the feedback correction based on the output of the air-fuel ratio sensor, it becomes possible to reliably supply a necessary amount of fuel into the cylinder during the second combustion.

The fuel injection correction coefficient for the first fuel injection valve and the second fuel injection valve with respect to the second fuel injection proportion in the second combustion may be learned in each learning region based on the fuel supply amount supplied into the cylinder, by performing the first combustion whose fuel injection proportion is set to the second fuel injection proportion, when the second combustion is a combustion performed at a lean air-fuel ratio and an engine temperature is less than or equal to a set temperature in the operation region of the second combustion.

Although the combustion temperature of the first combustion becomes relatively high, the in-cylinder temperature does not rise so high as to cause deposit precipitation on the nozzle hole of the first fuel injection valve if the engine temperature is less than or equal to the set temperature. In that case, deposit precipitation does not occur on the nozzle hole of the first fuel injection valve even though the fuel injection proportion of the first fuel injection valve is small since the fuel injection proportion is set to the second fuel injection proportion suitable for the second combustion.

If the engine temperature is higher than a set temperature when the fuel injection correction coefficient in the second combustion has not been learned in each learning region, the first combustion whose fuel injection proportion is the first fuel injection proportion may be carried out in the operation region of the second combustion.

If, when the engine temperature is higher than the set temperature, the first combustion whose fuel injection proportion is set to the second fuel injection proportion is carried out in the operation region of the second combustion in order to learn fuel injection correction coefficient in the second combustion, there is high possibility of the in-cylinder temperature further rising and causing deposit precipitation on the nozzle hole of the first fuel injection valve. Therefore, at this time, the learning of the fuel injection correction coefficient in the second combustion is abandoned, and the first combustion whose fuel injection proportion is the first fuel injection proportion is carried out, so as to curb the deposit precipitation on the nozzle hole of the first fuel injection valve and prevent deterioration of exhaust emission that would be caused by execution of the second combustion during which the accurate correction of the fuel supply amount is not carried out.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF PREFERRED EMBODIMENTS

Figure 1:
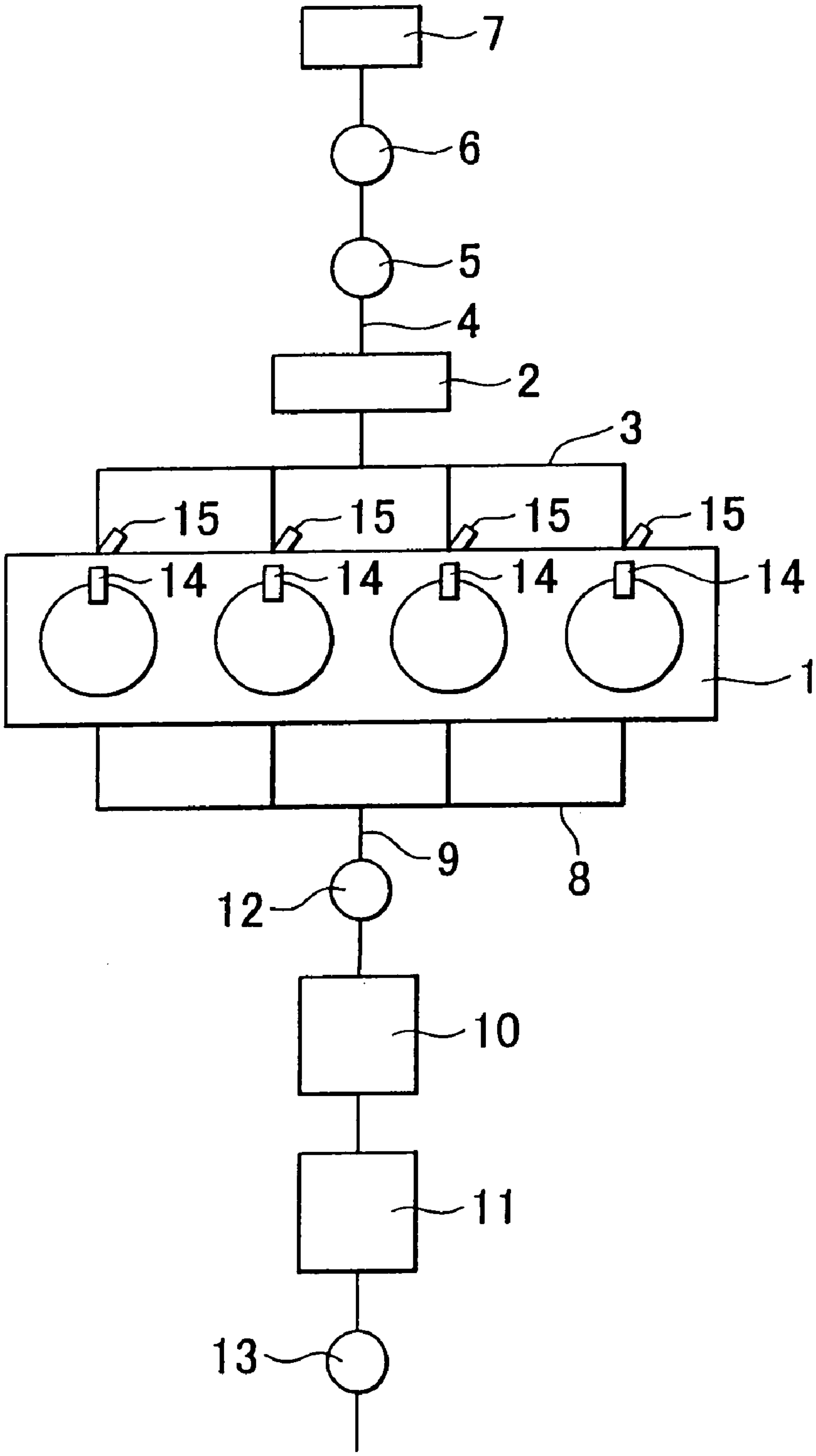
FIG. 1 is a schematic diagram showing an internal combustion engine in which a fuel injection control apparatus according to a first embodiment of the invention is mounted.

FIG. 1 is a schematic diagram showing an internal combustion engine in which a fuel injection control apparatus of a first embodiment is mounted. FIG. 1 shows an engine body 1, a surge tank 2 provided commonly for all cylinders, an intake manifold 3 connecting the surge tank 2 and the individual cylinders, an intake passageway 4 upstream of the surge tank 2. A throttle valve 5 is disposed immediately upstream of the surge tank 2 in the intake passageway 4. An air flow meter 6 for measuring the amount of intake air is disposed on the intake passageway 4 upstream of a throttle valve 5. An air cleaner 7 is disposed on a most upstream portion of the intake passageway 4.

An upstream-side $NO_X$ storage reduction catalyst device 10 and a downstream-side three-way catalyst device 11 are disposed in series on an exhaust passageway 9 downstream of an exhaust manifold 8 that is connected to the individual cylinders. An air-fuel ratio sensor 12 capable of detecting the air-fuel ratio of exhaust gas is disposed at the upstream side of the $NO_X$ storage reduction catalyst device 10. An oxygen sensor 13 capable of detecting whether the air-fuel ratio of exhaust gas is on the fuel-rich or lean side of the stoichiometric ratio. The deviation of the output of the air-fuel ratio sensor 12 to the fuel-rich or lean side is corrected on the basis of the output of the oxygen sensor 13. FIG. 1 further shows first fuel injection valves 14 for injecting fuel directly into the individual cylinders, and second fuel injection valves 15 for injecting fuel into intake ports of the individual cylinders.

In this internal combustion engine, the first fuel injection valve 14 of each cylinder injects fuel during the intake stroke, and the second fuel injection valve 15 injects fuel during the intake stroke (intake-synchronous injection) or during the exhaust stroke preceding the intake stroke or the like (intake-asynchronous injection). The fuel injected from the first fuel injection valve 14 and the fuel injected from the second fuel injection valve 15 form a homogeneous mixture in the cylinder, thus accomplishing homogeneous combustion. In a high load-side region where the engine load is greater than or equal to a set load, the air-fuel ratio of homogeneous mixture is adjusted to the stoichiometric air-fuel ratio (or to a rich air-fuel ratio that is slightly to the fuel-rich side of the stoichiometric air-fuel ratio). In a low load-side region where the engine load is less than the set load, the air-fuel ratio of homogeneous mixture is adjusted to a lean air-fuel ratio that is on the fuel-lean side of the stoichiometric air-fuel ratio, so as to curb the fuel consumption. As this lean air-fuel ratio, a value of 18 or higher is selected to curb the amount of $NO_X$ produced. In the description below, the combustion at the stoichiometric air-fuel ratio is termed "first combustion", and the combustion at the lean air-fuel ratio and the combustion at the time of rich spike are termed "second combustion".

The fuel injected directly into the cylinder from the first fuel injection valve 14 is advantageous for enhancing the intake charging efficiency since the fuel sufficiently lowers the temperature in the cylinder when vaporizing in the cylinder. On the other hand, the fuel injected from the second fuel injection valve 15 is advantageous for fuel homogenization in the cylinder since the fuel enters the cylinder together with the intake air. Therefore, for the first combustion, in which there is a need to produce high engine output, it is preferable that, with regard to each necessary fuel supply amount, the amount of fuel injected from the second fuel injection valve 15 be reduced, and the amount of fuel injected from the first fuel injection valve 14 be correspondingly increased. For example, the fuel injection proportion between the first fuel injection valve 14 and the second fuel injection valve 15 is 7:3. For the second combustion, in which there is no need to produce very high engine output but there is a need to enhance the homogeneity of homogeneous mixture and stabilize the combustion, it is preferable that, with regard to each necessary fuel supply amount, the amount of fuel injected from the first fuel injection valve 14 be reduced and the amount of fuel injected from the second fuel injection valve 15 be correspondingly increased. For example, the fuel injection proportion between the first fuel injection valve 14 and the second fuel injection valve 15 is 3:7.

Since homogeneity is also necessary in the first combustion, 30% of the fuel supply amount for the first combustion is injected via the second fuel injection valve 15. On the other hand, for the second combustion, it is conceivable that the entire fuel supply amount may be injected via the second fuel injection valves 15. However, if the fuel injection from the first fuel injection valves 14 stops, nozzle holes having openings in cylinders may be clogged due to deposit precipitation on the holes. Therefore, for the second combustion, 30% of the fuel supply amount is injected via the first fuel injection valves 14.

Furthermore, in the second combustion of the lean combustion air-fuel ratio, the combustion temperature does not become very high, so that the in-cylinder temperature does not rise very high. Therefore, the injection of about 30% of the fuel supply amount via the first fuel injection valves 14 can curb the deposit precipitation on the nozzle holes of the first fuel injection valves 14. However, in the first combustion of the stoichiometric combustion air-fuel ratio, the combustion temperature is high, and raises the in-cylinder temperature considerably high. Therefore, unless about 70% of the fuel supply amount is injected via the first fuel injection valves 14, the deposit precipitation on the nozzles holes of the first fuel injection valves 14 cannot be curbed.

In the meantime, in order to accurately control the amount of fuel supplied into the cylinder, the amounts of fuel injected from the first fuel injection valve 14 and the second fuel injection valve 15 need to be corrected. However, in the case where fuel is always injected from the two fuel injection valves as in the internal combustion engine in this embodiment, it is difficult to grasp the fuel injection amounts that are actually provided by the first fuel injection valve 14 and by the second fuel injection valve 15. Therefore, it is difficult to set a different fuel injection correction coefficient for each fuel injection valve. Hence, the fuel supply amount actually supplied into each cylinder (the total of the amounts of fuel injected from the first fuel injection valve 14 and from the second fuel injection valve 15) is calculated from the air-fuel ratio of exhaust gas detected by the air-fuel ratio sensor 12. Then, on the basis of the excess or deficiency of the fuel supply amount from the necessary fuel supply amount, the same fuel injection correction coefficient with respect to the first fuel injection valves 14 and the second fuel injection valves 15 is learned.

The thus-learned fuel injection correction coefficient is effective only with respect to the fuel injection proportion between the first fuel injection valves 14 and the second fuel injection valves 15 at the time of learning and, strictly speaking, the necessary fuel supply amount at the time of learning. For example, if the fuel injection proportion between the first fuel injection valve 14 and the second fuel injection valve 15 is 7:3 when the necessary fuel supply amount is 20 $mm^3$, it is required that the first fuel injection valve 14 inject 14 $mm^3$ of fuel and the second fuel injection valve 15 inject 6 $mm^3$ of fuel. Furthermore, if the fuel injection proportion between the first fuel injection valve 14 and the second fuel injection valve 15 is 3:7 when the necessary fuel supply amount is 20 $mm^3$, it is required that the first fuel injection valve 14 inject 6 $mm^3$ of fuel and the second fuel injection valve 15 inject 14 $mm^3$ of fuel.

If in such cases the first fuel injection valve 14 can inject only 80% of the required amount of fuel and the second fuel injection valve 15 can inject only 90% of the required amount of fuel, the fuel injection correction coefficient calculated when the fuel injection proportion is 7:3 is 20/(14*0.8+6*0.9) =1.20, and the fuel injection correction coefficient calculated when the fuel injection proportion is 3:7 is 20/(6*0.8+14*0.9) =1.15. In the calculation of the fuel injection correction coefficient, the value in the foregoing parentheses is the actual fuel supply amount based on the actual air-fuel ratio of exhaust gas detected by the air-fuel ratio sensor 12. Thus, if the fuel injection proportion varies, the fuel injection correction coefficient common to the first fuel injection valve 14 and the second fuel injection valve 15 apparently varies. Furthermore, the fuel injection correction coefficient also varies if the necessary fuel supply amount changes.

Therefore, it is conceivable to learn a fuel injection correction coefficient for the necessary fuel supply amount separately for each of the first combustion and the second combustion that are different from each other in the fuel injection proportion. However, the air-fuel ratio sensor 12 cannot accurately detect the lean air-fuel ratio as in the second combustion, that is, the actual fuel supply amount at this time cannot be grasped. Therefore, during the second combustion, the fuel injection correction coefficient cannot be learned, unless a measure is taken.

Figure 2:
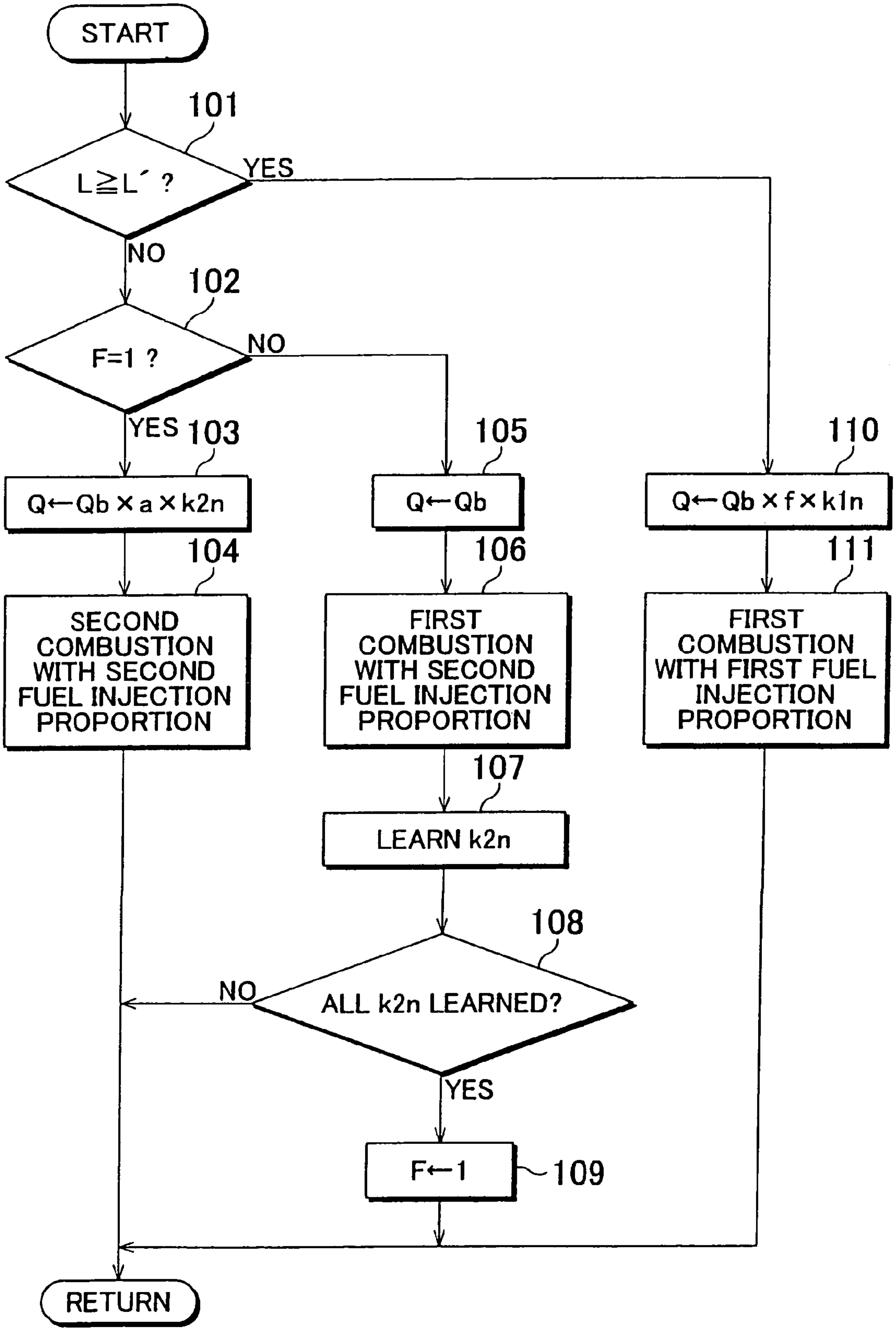
FIG. 2 is a flowchart showing a fuel injection control carried out by the fuel injection control apparatus according to the first embodiment.

The fuel injection control apparatus of this embodiment is able to learn a fuel injection correction coefficient k2*n* at the time of the second combustion by following a flowchart shown in FIG. 2. Firstly in step 101, it is judged whether or not a required engine load L is greater than or equal to a set load L'. An affirmative judgment made in this step means that the present operation region is the operation region of the first combustion of the stoichiometric air-fuel ratio, and is followed by step 110. In step 110, a fuel supply amount Q is calculated by multiplying a basic fuel supply amount Qb necessary for the stoichiometric air-fuel ratio operation based on the engine load, the engine rotation speed, etc., by a feedback correction coefficient f of the air-fuel ratio sensor 12, and a first fuel injection correction coefficient k1*n*. Subsequently in step 111, in order to supply the fuel supply amount Q into the cylinder on the basis of the first fuel injection proportion (e.g., 7:3) of the first combustion, fuel injection amounts of the first fuel injection valve 14 and the second fuel injection valve 15 are separately set and the first combustion is accordingly carried out. That is, the fuel injection amounts of the first fuel injection valve 14 and the second fuel injection valve 15 for the injection of the basic fuel supply amount Qb at the first fuel injection proportion are corrected by the same first fuel injection correction coefficient k1*n*. Incidentally, the necessary fuel supply amount to be supplied into the cylinder is the basic fuel supply amount Qb.

Figure 3:
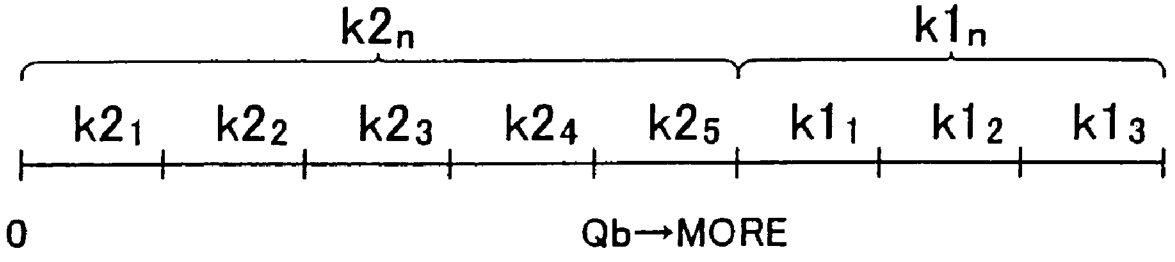
FIG. 3 is a map of learning regions used according to the flowcharts shown in FIGS. 2 and 4.

The first fuel injection correction coefficient k1*n* is set separately in each of divided regions, for example, three regions, in the range of the basic fuel supply amount Qb of the first combustion, as shown FIG. 3. In the first combustion, the feedback correction coefficient f for further correcting the basic fuel supply amount Qb corrected by the first fuel injection correction coefficient k1*n* is calculated so that the air-fuel ratio of exhaust gas detected by the air-fuel ratio sensor 12 becomes equal to the stoichiometric air-fuel ratio. The first fuel injection correction coefficient k1*n* is updated at the time of operation in each region so that the calculated feedback correction coefficient f becomes equal to "1".

On the other hand, if the required engine load L is less than the set load L', the engine operation region is an operation region in which the second combustion of lean air-fuel ratio should be performed, and a negative judgment is made in step 101, and the process proceeds to step 102. In step 102, it is judged whether or not a flag F that is reset to "0" when the engine is stopped is "1". Initially, the flag F is "0", and therefore a negative judgment is made in step 102, and the process proceeds to step 105. In step 105, the basic fuel supply amount Qb necessary for the stoichiometric air-fuel ratio operation based on the engine load, the engine rotation speed, etc., is directly set as a fuel supply amount Q.

Although the present operation region is an operation region in which the second combustion with the required engine load L being less than the set load L' should be performed, a reducing correction of the basic fuel supply amount Qb that should be carried out in order to adjust the combustion air-fuel ratio to a lean air-fuel ratio is not carried out when the flag F is "0" (i.e., during an initial period following the start of the engine). Subsequently in step 106, in order to supply the fuel supply amount Q into each cylinder on the basis of a second fuel injection proportion (e.g., 3:7) of the second combustion, fuel injection amounts of the first fuel injection valve 14 and the second fuel injection valve 15 are respectively set, and the first combustion of the stoichiometric air-fuel ratio is carried out.

Subsequently in step 107, an actual fuel supply amount Q' is calculated on the basis of the air-fuel ratio of exhaust gas near the stoichiometric air-fuel ratio detected by the air-fuel ratio sensor 12 during the first combustion, and the ratio Qb/Q' of the basic fuel supply amount Qb to the actual fuel supply amount Q' is learned as a second fuel injection correction coefficient k2*n*. The second fuel injection correction coefficient k2*n* needs to be learned separately in each of divided regions, for example, five regions, in the range of the basic fuel supply amount Qb of the second combustion, as shown in FIG. 3.

In step 108, it is judged whether or not all the five second fuel injection correction coefficients k2*n* have been learned. If a negative judgment is made in this step, the process ends with the flag F remaining at "0". Therefore, during the operation region of the second combustion, the process of step 105 to step 107 is repeatedly executed. While the process is repeatedly executed, the basic fuel supply amount Qb changes due to changes in the engine load and the engine rotation speed, so that the second fuel injection correction coefficient k2*n* of another region is learned. Thus, the second fuel injection correction coefficients k2*n* of all the regions are eventually learned. Then, an affirmative judgment is made in step 108, and in step 109 the flag F is set to "1".

As a result, an affirmative judgment is made in step 102 during the operation region in which the second combustion should be performed. Then in step 103, a fuel supply amount Q is calculated by multiplying the basic fuel supply amount Qb necessary for the stoichiometric air-fuel ratio based on the engine load, the engine rotation speed, etc., by a reducing correction coefficient a (positive value less than "1") for adjusting the combustion air-fuel ratio to a lean air-fuel ratio, and by the second fuel injection correction coefficient k2*n*. Subsequently in step 104, in order to supply the fuel supply amount Q into each cylinder on the basis of the second fuel injection proportion of the second combustion (e.g., 3:7), fuel injection amounts of the first fuel injection valve 14 and the second fuel injection valve 15 are respectively set, and the second combustion is carried out. That is, the fuel injection amounts of the first fuel injection valve 14 and the second fuel injection valve 15 for the injection, at the second fuel injection proportion, of the basic fuel supply amount Qb*a reduction-corrected for the second combustion are not feedback-corrected on the basis of the output of the air-fuel ratio sensor 12, but are corrected by the second fuel injection correction coefficient k2*n*. It is to be noted herein that the necessary fuel supply amount that should be supplied into each cylinder is the reduction-corrected basic fuel supply amount Qb*a. Furthermore, as the second fuel injection correction coefficient k2*n*, the second fuel injection correction coefficient of a region that corresponds to the reduction-corrected basic fuel supply amount Qb*a is selected.

Incidentally, during the first combustion of stoichiometric air-fuel ratio, exhaust gas is favorably purified by the three-way catalyst device 11. On the other hand, during the second combustion of lean air-fuel ratio, $NO_X$ in exhaust gas is stored in the $NO_X$ storage reduction catalyst device 10. However, the $NO_X$ storage reduction catalyst device 10 is not capable of storing $NO_X$ limitlessly, and it is necessary to perform a regeneration process of reducing and purifying the catalyst device by releasing stored $NO_X$ before the amount of stored $NO_X$ reaches the maximum storable amount. This regeneration process is accomplished by adjusting the air-fuel ratio of exhaust gas to the rich side of the stoichiometric air-fuel ratio. In order to accomplish this, a rich spike operation of adjusting the combustion air-fuel ratio to a desired rich air-fuel ratio is carried out.

The air-fuel ratio sensor 12 is not able to accurately detect the rich air-fuel ratio caused by the rich spike. Therefore, at the time of the rich spike, the fuel injection amount cannot be feedback-corrected on the basis of the output of the air-fuel ratio sensor 12. The time when the rich spike is carried out is when an estimated amount of stored $NO_X$ of the $NO_X$ storage reduction catalyst device 10 reaches a set amount, and is often during the second combustion of lean air-fuel ratio. When the rich spike is to be carried out, the process of step 103 may be performed in the following manner in order to obtain a rich combustion air-fuel ratio. That is, a fuel supply amount Q is calculated by multiplying the basic fuel supply amount Qb by an increasing correction coefficient b (value greater than "1") instead of the reducing correction coefficient a, as well as by the second fuel injection correction coefficient k2*n*.

The rich spike is an operation of supplying a fuel supply into each cylinder on the basis of the second fuel injection proportion (e.g., 3:7) of the second combustion in an operation region where the second combustion should be performed. In the rich spike, fuel injection amounts of the first fuel injection valve 14 and the second fuel injection valve 15 are accordingly set, and combustion at a rich air-fuel ratio is carried out. That is, the fuel injection amounts of the first fuel injection valve 14 and the second fuel injection valve 15 for the injection, at the second fuel injection proportion, of the basic fuel supply amount Qb*b increase-corrected for the combustion of rich air-fuel ratio are not feedback-corrected on the basis of the output of the air-fuel ratio sensor 12, but are corrected by the second fuel injection correction coefficient k2*n*. It is to be noted herein that the necessary fuel supply amount that should be supplied into each cylinder is the increase-corrected basic fuel supply amount Qb*b. Furthermore, as the second fuel injection correction coefficient k2*n*, the second fuel injection correction coefficient of a region that corresponds to the increase-corrected basic fuel supply amount Qb*b is selected. Thus, the second fuel injection correction coefficient k2*n* learned in step 107 can be used not only at the time of the second combustion of lean air-fuel ratio, but also at the time of rich spike.

In the first embodiment, the value of the fuel injection correction coefficient varies for every necessary fuel supply amount, regardless of the fuel injection proportion between the first fuel injection valve 14 and the second fuel injection valve 15. Although in the first embodiment, the first fuel injection proportion of the first combustion and the second fuel injection proportion of the second combustion are different from each other, the invention is effective even if the first fuel injection proportion and the second fuel injection proportion are the same in the case where the combustion air-fuel ratio of the second combustion is not the stoichiometric air-fuel ratio and where the fuel injection correction coefficient cannot be learned.

Figure 4:
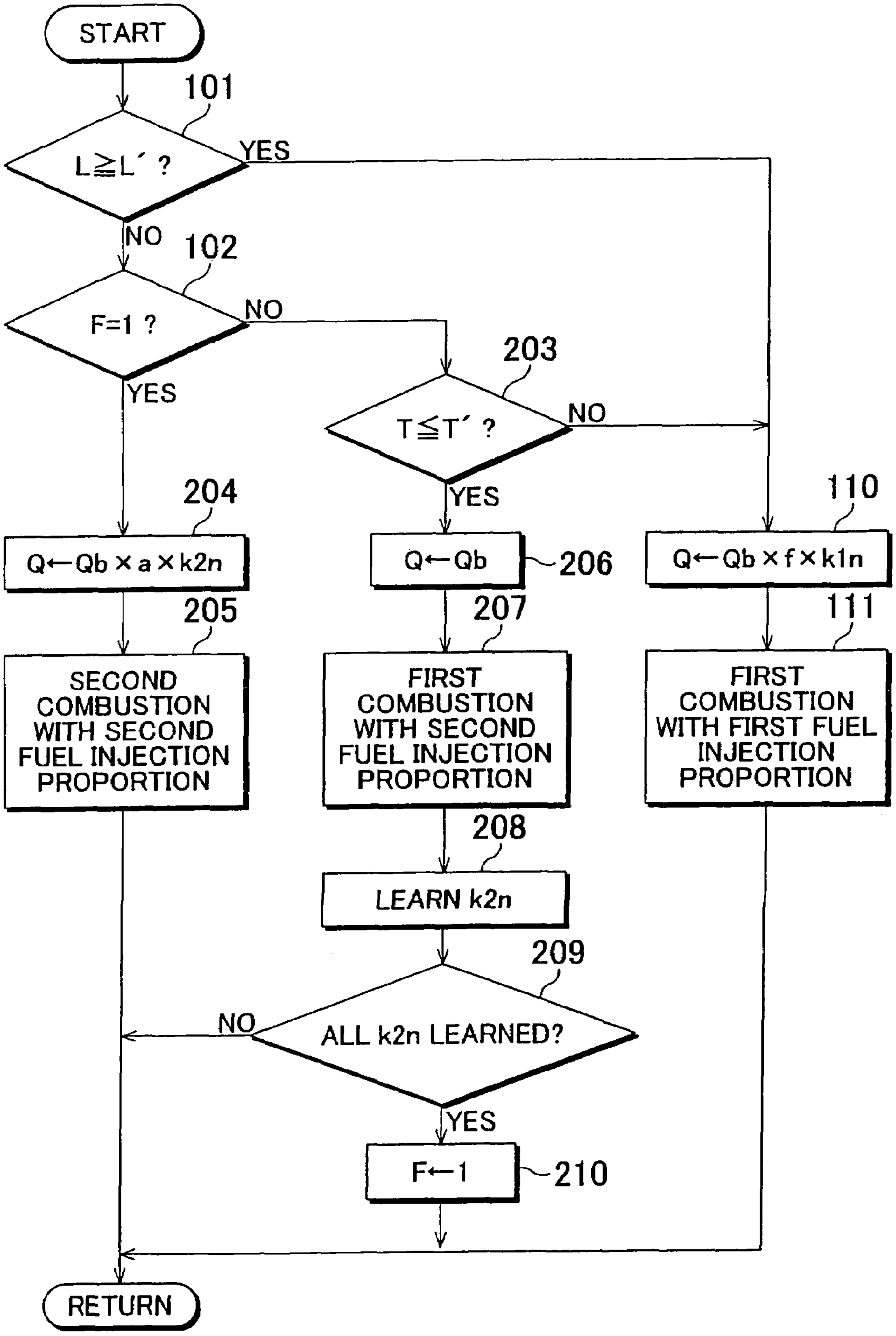
FIG. 4 is a flowchart showing a fuel injection control carried out by a fuel injection control apparatus according to a second embodiment of the invention.

Next, a second embodiment of the invention will be described. The hardware structure of a fuel injection control apparatus of the second embodiment is substantially the same as that of the first embodiment, and the description thereof will be omitted below. The fuel injection control apparatus is capable of learning the fuel injection correction coefficient k2*n* at the time of the second combustion by following a flowchart shown in FIG. 4. Steps 101, 110 and 111 are the same as those in the first embodiment, and the description thereof will be omitted below. Furthermore, the correction coefficients k1*n* ($k1_1$ to $k1_3$) and k2*n* ($k2_1$ to $k2_5$) are also the same as those in the first embodiment, and the description thereof will be omitted below. However, since step 203, which is not carried out in the first embodiment, is carried out, the values used in step 203 may be appropriately set for the second embodiment. The reducing correction coefficient a and the increasing correction coefficient b may also be set suitably for the second embodiment.

If an affirmative judgment is made in step 101, it is judged in step 102 whether or not the flag F, which is reset to "0" at the time of stop of the engine, is "1". Initially, the flag F is "0", and therefore a negative judgment is made in step 102, and the process proceeds to step 203. In step 203, it is judged whether or not an engine temperature T represented by the cooling water temperature or the like is less than or equal to a set temperature T'. If an affirmative judgment is made in this step, for example, during a state immediately after the engine is started, the process proceeds to step 206. In step 206, the basic fuel supply amount Qb necessary for the stoichiometric air-fuel ratio operation based on the engine load, the engine rotation speed, etc. is directly set as a fuel supply amount Q.

Although the present operation region is an operation region in which the second combustion with the required engine load L being less than the set load L' should be performed, a reducing correction of the basic fuel supply amount Qb for adjusting the combustion air-fuel ratio to a lean air-fuel ratio is not carried out when the flag F is "0" (i.e., during an initial period following the start of the engine). Subsequently in step 207, in order to supply the fuel supply amount Q into each cylinder on the basis of the second fuel injection proportion (e.g., 3:7) of the second combustion, fuel injection amounts of the first fuel injection valve 14 and the second fuel injection valve 15 are respectively set, and the first combustion of the stoichiometric air-fuel ratio is carried out.

Subsequently in step 208, an actual fuel supply amount Q' is calculated on the basis of the air-fuel ratio of exhaust gas near the stoichiometric air-fuel ratio detected by the air-fuel ratio sensor 12 during the first combustion, and the ratio Qb/Q' of the basic fuel supply amount Qb to the actual fuel supply amount Q' is learned as a second fuel injection correction coefficient k2*n*. The second fuel injection correction coefficient k2*n* needs to be learned separately in each of divided regions, for example, five regions, in the range of the basic fuel supply amount Qb of the second combustion, as shown in FIG. 3.

In step 209, it is judged whether or not all the five second fuel injection correction coefficients k2*n* have been learned. If a negative judgment is made in this step, the process ends with the flag F remaining at "0". Therefore, during the operation region of the second combustion, the process of step 203 to step 208 is repeatedly executed. While the process is repeatedly executed, the basic fuel supply amount Qb changes due to changes in the engine load and the engine rotation speed, so that the second fuel injection correction coefficient k2*n* of another region is learned. Thus, the second fuel injection correction coefficients k2*n* of all the regions are eventually learned. Then, an affirmative judgment is made in step 209, and in step 210 the flag F is set to "1".

As a result, an affirmative judgment is made in step 102 during the operation region in which the second combustion should be performed. Then in step 204, a fuel supply amount Q is calculated by multiplying the basic fuel supply amount Qb necessary for the stoichiometric air-fuel ratio based on the engine load, the engine rotation speed, etc., by a reducing correction coefficient a (positive value less than "1") for adjusting the combustion air-fuel ratio to a lean air-fuel ratio, and by the second fuel injection correction coefficient k2*n*. Subsequently in step 205, in order to supply the fuel supply amount Q into each cylinder on the basis of the second fuel injection proportion of the second combustion (e.g., 3:7), fuel injection amounts of the first fuel injection valve 14 and the second fuel injection valve 15 are respectively set, and the second combustion is carried out. That is, the fuel injection amounts of the first fuel injection valve 14 and the second fuel injection valve 15 for the injection, at the second fuel injection proportion, of the basic fuel supply amount Qb*a reduction-corrected for the second combustion are not feedback-corrected on the basis of the output of the air-fuel ratio sensor 12, but are corrected by the second fuel injection correction coefficient k2*n*. It is to be noted herein that the necessary fuel supply amount that should be supplied into each cylinder is the reduction-corrected basic fuel supply amount Qb*a. Furthermore, as the second fuel injection correction coefficient k2*n*, the second fuel injection correction coefficient of a region that corresponds to the reduction-corrected basic fuel supply amount Qb*a is selected.

While the second fuel injection correction coefficients k2*n* are being learned (while the flag is "0"), the first combustion during which the fuel supply amount can be detected by the air-fuel ratio sensor 12 is carried out in an operation region in which the second combustion should be performed. Therefore, in this case, the combustion temperature is higher than in the case where the second combustion is actually carried out. When the engine temperature T is less than or equal to the set temperature T', the fuel injection proportion is set to the second fuel injection proportion, so that the fuel injection proportion of the first fuel injection valve 14 becomes smaller. Hence, the cooling effect caused by the injected fuel on the nozzle hole of the first fuel injection valve 14 cannot be sufficiently obtained. However, since the engine temperature T is less than or equal to the set temperature T', the in-cylinder temperature does not rise so high as to cause deposit precipitation on the nozzle hole of the first fuel injection valve 14.

On the other hand, when the engine temperature T is higher than the set temperature T', the first combustion carried out at the second fuel injection proportion may lead to excessively high in-cylinder temperature and deposit precipitation on the nozzle hole of a first fuel injection valve 14. Therefore, when the engine temperature T is higher than the set temperature T' even though the flag F is "0", a negative judgment is made in step 203, followed by steps 110 and 111, in which the first combustion with the first fuel injection proportion is carried out.

When the first fuel injection proportion is used, the fuel injection proportion of the first fuel injection valve 14 is large, so that even if the in-cylinder temperature rises, the relatively large amount of injected fuel sufficiently cools the nozzle hole of the first fuel injection valve 14, and therefore can curb the deposit precipitation on the nozzle hole. During the first combustion, the fuel injection amount is corrected by the feedback correction coefficient f that is calculated on the basis of the output of the air-fuel ratio sensor 12. Therefore, the good first combustion at the stoichiometric air-fuel ratio can be realized. At this time, the first fuel injection correction coefficient k1*n* with respect to the fuel supply amount during the operation region of the second combustion can also be calculated on the basis of the calculated feedback correction coefficient f, if necessary.

Incidentally, the correction of the fuel injection amount at the time of the rich spike performed for the regeneration of the $NO_X$ storage reduction catalyst device 10 is substantially the same as in the first embodiment.

Although in the first and second embodiments, the second combustion is not carried out despite attainment of the operation region of the second combustion until the second fuel injection correction coefficients k2*n* in all the learning regions are learned, the second combustion with the second fuel injection proportion may also be performed in a different manner. That is, when the second fuel injection correction coefficient in a learning region has been learned, the second combustion with the second fuel injection proportion may be carried out in that learning region through the use of the learned second fuel injection correction coefficient.

Although in the first and second embodiments, the learning regions of the fuel injection correction coefficients based on the necessary fuel supply amount are provided by dividing the operation region for the first combustion into three learning regions, and by dividing the operation region for the second combustion into five learning regions, this does not limit the invention. The value of the fuel injection correction coefficient common to the first fuel injection valves 14 and the second fuel injection valves 15, strictly speaking, is different for every necessary fuel supply amount. Therefore, by further dividing each operation region so that the learning regions become even smaller ranges of the necessary fuel supply amount, each fuel injection correction coefficient can be made more accurate.

In the first and second embodiments, since the fuel injection proportion for the rich spike is the same as the second fuel injection proportion for the second combustion, the fuel injection amount for the rich spike is corrected by using the second fuel injection correction coefficient k2*n* that has been learned with respect to the second fuel injection proportion. Of course, if the fuel injection proportion between the first fuel injection valves and the second fuel injection valves for the rich spike is different from the second fuel injection proportion, the second fuel injection correction coefficient k2*n* cannot be used for the rich spike. In that case, the rich spike may be performed, for example, in the following manner. That is, the fuel injection amounts of the first fuel injection valves and the second fuel injection valves are set on the basis of the fuel injection proportion for the rich spike within the range of the fuel supply amount for the rich spike, and the first combustion is carried out, and the fuel injection correction coefficient for the rich spike is learned separately in each learning region based on the required fuel supply amount. Furthermore, although in the first and second embodiments, the learning of the second fuel injection correction coefficient k2*n* is carried out immediately after the engine is started, this does not limit the invention. The period of carrying out the learning can be set in any suitable manner.

The invention claimed is:

1. An fuel injection control apparatus of an internal combustion engine, comprising:

a first fuel injection valve that injects fuel into a cylinder;

a second fuel injection valve that injects fuel into an intake port; and a control device that switches between a first combustion whose combustion air-fuel ratio is near a stoichiometric air-fuel ratio and whose fuel injection proportion between the first fuel injection valve and the second fuel injection valve is a first fuel injection proportion, and a second combustion whose combustion air-fuel ratio is an air-fuel ratio different from the combustion air-fuel ratio of the first combustion and whose fuel injection proportion between the first fuel injection valve and the second fuel injection valve is a second fuel injection proportion, wherein the control device learns a fuel injection correction coefficient for the first fuel injection valve and the second fuel injection valve with respect to the second fuel injection proportion in the second combustion, in each learning region based on a fuel supply amount supplied into the cylinder, by performing the first combustion whose fuel injection proportion is set to the second fuel injection proportion, in an operation region in which the second combustion is to be performed.

2. The fuel injection control apparatus according to claim 1, wherein the fuel injection correction coefficient is calculated from a basic fuel supply amount necessary for the first combustion, and from an actual fuel supply amount calculated from an output of an air-fuel ratio sensor disposed in an exhaust system of the internal combustion engine when the first combustion whose fuel injection proportion is set to the second fuel injection proportion is performed in the operation region in which the second combustion is to be performed.

3. The fuel injection control apparatus according to claim 1, wherein fuel injection amounts of the first fuel injection valve and the second fuel injection valve during the second combustion are corrected by the learned fuel injection correction coefficient without carrying out a feedback correction based on the output of the air-fuel ratio sensor disposed in the exhaust system of the internal combustion engine.

4. The fuel injection control apparatus according to claim 3, wherein the second combustion is carried out after the fuel injection correction coefficient has been learned in all the learning regions.

5. The fuel injection control apparatus according to claim 3, wherein the second combustion is carried out, starting in the learning region in which the fuel injection correction coefficient has been learned.

6. The fuel injection control apparatus according to claim 1, wherein the first combustion is performed when a load of the internal combustion engine is greater than or equal to a predetermined value.

7. The fuel injection control apparatus according to claim 1, wherein the second combustion includes a combustion at a lean air-fuel ratio which is performed when a load of the internal combustion engine is less than a predetermined value.

8. The fuel injection control apparatus according to claim 7, wherein the fuel injection correction coefficient for the first fuel injection valve and the second fuel injection valve with respect to the second fuel injection proportion in the second combustion is learned in each learning region based on the fuel supply amount supplied into the cylinder, by performing the first combustion whose fuel injection proportion is set to the second fuel injection proportion, when an engine temperature is less than or equal to a set temperature in the operation region in which the second combustion is to be performed.

9. The fuel injection control apparatus according to claim 8, wherein if the engine temperature is higher than the set temperature when the fuel injection correction coefficient in the second combustion has not been learned in each learning region, the first combustion whose fuel injection proportion is the first fuel injection proportion is carried out in the operation region in which the second combustion is to be performed.

10. The fuel injection control apparatus according to claim 7, wherein a basic fuel supply amount necessary for the first combustion is reduction-corrected so that the second combustion is carried out.

11. The fuel injection control apparatus according to claim 1, wherein the second combustion includes a combustion during a rich spike that is performed for a regeneration process of a $NO_x$ storage reduction catalyst device disposed in an exhaust system of the internal combustion engine.

12. The fuel injection control apparatus according to claim 11, wherein a basic fuel supply amount necessary for the first combustion is reduction-corrected so that the second combustion is carried out.

13. The fuel injection control apparatus according to claim 1, wherein fuel is injected from the first fuel injection valve also in the first combustion.

14. A fuel injection control method of an internal combustion engine which switches between a first combustion whose combustion air-fuel ratio is near a stoichiometric air-fuel ratio and whose fuel injection proportion between a first fuel injection valve that injects fuel into a cylinder and a second fuel injection valve that injects fuel into an intake port is a first fuel injection proportion, and a second combustion whose combustion air-fuel ratio is an air-fuel ratio different from the combustion air-fuel ratio of the first combustion and whose fuel injection proportion between the first fuel injection valve and the second fuel injection valve is a second fuel injection proportion, the fuel injection control method comprising:

determining whether or not an operation region of the internal combustion engine is an operation region in which the second combustion is to be performed;

determining whether or not a fuel injection correction coefficient for the first fuel injection valve and the second fuel injection valve with respect to the second fuel injection proportion in the second combustion has been obtained; and obtaining the fuel injection correction coefficient by carrying out the first combustion whose fuel injection proportion is set to the second fuel injection proportion, in the operation region in which the second combustion is to be performed, if the fuel injection correction coefficient has not been obtained while it has been determined that the operation region of the internal combustion engine is the operation region in which the second combustion is to be performed.

15. An fuel injection control apparatus of an internal combustion engine, comprising:

a first fuel injection valve that injects fuel into a cylinder;

a second fuel injection valve that injects fuel into an intake port;

an air-fuel ratio sensor provided in an exhaust system of the internal combustion engine; and a control device that switches between a first combustion whose combustion air-fuel ratio is an air-fuel ratio obtained via the air-fuel ratio sensor and whose fuel injection proportion between the first fuel injection valve and the second fuel injection valve is a first fuel injection proportion, and a second combustion whose combustion air-fuel ratio is an air-fuel ratio that is not obtained via the air-fuel ratio sensor and whose fuel injection proportion between the first fuel injection valve and the second fuel injection valve is a second fuel injection proportion, wherein the control device learns a fuel injection correction coefficient for the first fuel injection valve and the second fuel injection valve with respect to the second fuel injection proportion in the second combustion, in each learning region based on a fuel supply amount supplied into the cylinder, by performing the first combustion whose fuel injection proportion is set to the second fuel injection proportion, in an operation region in which the second combustion is to be performed.

* * * * *